United States Patent Office 2,950,966
Patented Aug. 30, 1960

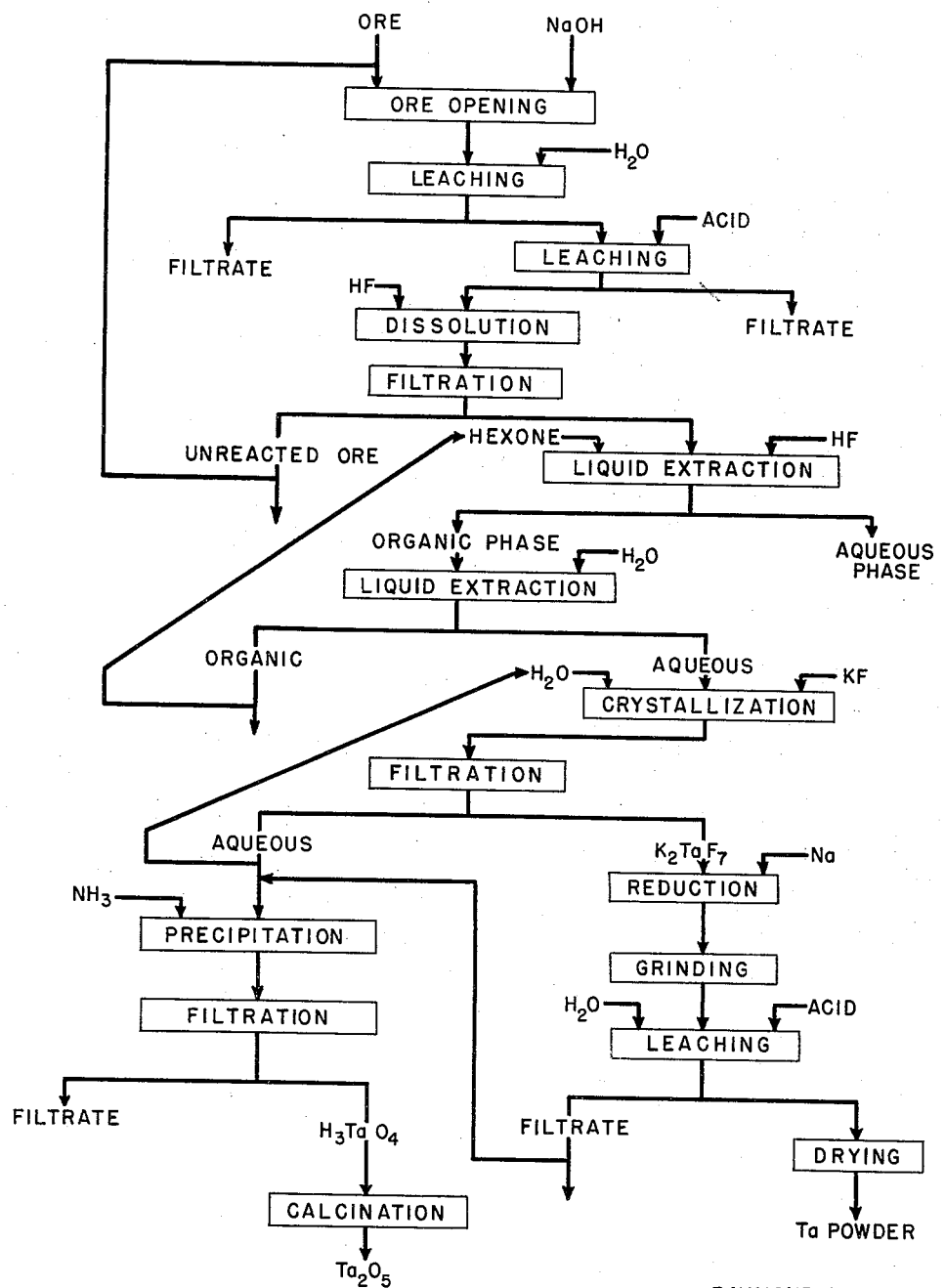

2,950,966

RECOVERY OF TANTALUM VALUES

Raymond A. Foos, Cincinnati, Ohio, assignor to National Distillers and Chemical Corporation, New York, N.Y., a corporation of Virginia Filed June 20, 1958, Ser. No. 743,284

14 Claims. (Cl. 75—121)

This invention relates to a new and improved process for the recovery of tantalum values from ores. More particularly, the invention is concerned with a method for the preparation of tantalum metal and certain tantalum compounds.

In recent years numerous uses have been developed for tantalum metal. For many of the commercial purposes such as in the fabrication of electrolytic capacitors and in the preparation of tantalum alloys it is essential to employ metallic tantalum in pure form. Tantalum is, however, ordinarily associated in nature with columbium, often referred to as niobium, as in the well-known columbite-tantalite ores. These ores usually contain the columbium and tantalum in the form of their pentoxides together with ferrous and manganous oxides. Other metallic impurities which may be present include silicon, tin, titanium, tungsten, molybdenum, vanadium and aluminum oxides, as well as combined sodium. Thus, in order to obtain substantially pure tantalum metal it is necessary to provide a process which will effectively separate the tantalum values from the columbium and other impurities.

One object of this invention is to provide an effective process for the separation of the tantalum from columbium and other metallic impurities. Another object is to provide a commercially attractive continuous process for the recovery of tantalum values from its ores in high yields. Other objects will become apparent from the ensuing description of the invention.

In accordance with the present invention it has been found that these objects are accomplished by treating a tantalum-containing material in certain definite sequential steps, as hereinafter described with particular reference to the accompanying drawing which is a flow sheet of the inventive process.

I. ORE OPENING

Tantalite ores, slags and concentrates are useful as starting materials in the process of this invention. The ores are mixed pentoxides of columbium and tantalum containing manganous oxide, ferrous oxide, silicon dioxide, tin dioxide, titanium dioxide and aluminum oxide as possible major impurities. An example of such an ore is one obtained from Nigeria having the following compositon:

| | Wt. percent |
|---|---|
| $Ta_2O_5$ | 53.0 |
| $Cb_2O_5$ | 21.5 |
| $TiO_2$ | 2.0 |
| $SnO_2$ | 6.2 |
| FeO | 5.4 |
| $MnO_2$ | 10.2 |
| Others | 1.7 |

In general, those ores containing from about 25 to 60% tantalum pentoxide are preferred, though it will be understood that even ores containing less than 5% by weight of tantalum pentoxide may be processed in accordance with this invention.

The first step in the process involves opening the tantalite-columbite ores to facilitate the separation of the tantalum from the columbium and other impurities. This can be accomplished by any one of the following methods:

(1) Caustic fusion utilizing sodium hydroxide, potassium hydroxide, sodium carbonate;
(2) Treatment with sulfuric acid; or
(3) Treatment with hydrofluoric acid.

Such severe ore opening procedures are required in view of the relatively insoluble characteristics of the tantalum constituents. It will be further understood that other ore opening methods, including variations of those outlined above, may also be employed in the present process. However, the caustic fusion and the sulfuric acid beneficiation methods have been found to be most suitable for this purpose.

For a more complete understanding of this particular step, the opening of a tantalite ore by fusion with sodium hydroxide will be described in detail. The tantalum ore is first mixed with sodium hydroxide in an ore to caustic ratio of about 1:0.75 to 1:1.5. In general, it has been found advantageous to use an amount of sodium hydroxide which is in excess over that amount theoretically required to react with the ore. By utilizing an excess of sodium hydroxide within the range of about 10 to 30 wt. percent the amount of unreacted ore was substantially reduced. In order to effect fusion, the reaction mixture is heated to a temperature within the range of about 250° to 600° C., preferably about 300° to 350° C., for about 0.5 to 2 hours.

The following are typical reactions which are believed to occur during fusion:

(1) $Ta_2O_5 + 6NaOH \rightarrow 2Na_3TaO_4 + 3H_2O$
(2) $Cb_2O_5 + 6NaOH \rightarrow 2Na_3CbO_4 + 3H_2O$
(3) $TiO_2 + 2NaOH \rightarrow Na_2TiO_3 + H_2O$
(4) $FeO + 2NaOH \rightarrow Na_2FeO_2 + H_2O$
(5) $MnO + 2NaOH + O_2 \rightarrow Na_2MnO_4 + H_2O$
(6) $SnO_2 + 2NaOH \rightarrow Na_2SnO_3 + H_2O$
(7) $SiO_2 + 2NaOH \rightarrow Na_2SiO_3 + H_2O$ The fused ore, commonly referred to as frit, is removed from the reaction vessel and crushed in conventional apparatus, such as a jaw crusher, to produce a finely divided material, which is more easily handled and treated in the subsequent operations.

In carrying out this fusion step, it is also preferred to crush or grind the crude ore to obtain a feed material having a particle size of less than about 100 mesh, though ores having a greater particle size may be employed.

II. LEACHING

The ground fused tantalite ore product is next subjected to certain specific leachings to remove undesirable metal contaminants from the tantalum salt. The fused ore is first washed with water to remove excess sodium hydroxide and such contaminants as silica, tin, alumina, tungsten, molybdenum, vanadium, etc. The fused ore is then washed with an aqueous solution of sodium hydroxide having a molarity of at least one to complete the removal of silicon, tin, aluminum, and sodium from the insoluble tantalum and columbium salts while preventing solubilization of tantalum and columbium. Following this treatment, the insoluble residue is leached with a mineral acid such as nitric, hydrochloric or sulfuric. In accordance with the preferred method of this invention, the acid leach solution comprises hot sulfuric acid, 1.0 to 3.0 N. Iron powder or sodium peroxide are added as reducing agents to the leach solution during leaching to convert manganese to a soluble form; the use of iron powder is preferred.

In addition to removing such metallic impurities as iron, manganese, nickel, magnesium, sodium, etc., the acid leaching serves to convert the insoluble sodium salts of tantalum and columbium, obtained from the caustic washing step, into the corresponding acids or hydrated oxides as follows:

(1) $2Na_3CbO_4 + 3H_2SO_4 \rightarrow 2H_3CbO_4 + 3Na_2SO_4$ (2) $2Na_3TaO_4 + 3H_2SO_4 \rightarrow 2H_3TaO_4 + 3Na_2SO_4$ These tantalum and columbium acid products are insoluble, and they are readily separated from most of the water, sodium sulfate and other impurities as an ore concentrate.

III. SEPARATION OF TANTALUM FROM COLUMBIUM

The insoluble tantalum and columbium acids recovered from the acid leaching step are contacted with hydrofluoric acid to effect the following conversions:

(1) $H_3TaO_4 + 7HF \rightarrow H_2TaF_7 + 4H_2O$ (2) $H_3CbO_4 + 5HF \rightarrow H_2CbOF_5 + 3H_2O$ In carrying out this treatment, it has been found to be essential to employ a minimum of excess fluoride ion in order to avoid the following reaction:

(3) $H_2CbOF_5 + 2HF \rightarrow H_2CbF_7 + H_2O$

If reaction (3) is allowed to proceed, e.g. by the use of an excess of hydrofluoric acid, the separation of fluotantalates from the fluocolumbates is more difficult than the separation of the fluotantalates from the pentafluooxycolumbates. In order to favor reactions (1) and (2) the amount of hydrofluoric acid employed is carefully controlled. This could be done, for example, by always utilizing small excess of the insoluble tantalic and columbic acids in the reaction vessel. This unreacted material can be easily separated from the reaction product mixture before separating the fluotantalate and pentafluooxycolumbate from each other. In general, the concentration of hydrofluoric acid employed to dissolve the columbic and tantalic earth acids should be from about 10 to 30 N.

Following treatment with hydrofluoric acid the reaction product mixture is filtered to remove unreacted oxides, unreacted ore and other solids. The resulting clear solution having a pH of from about 0.5 to 2.5 is then fed to an extraction system wherein it is countercurrently contacted with a water-immiscible, organic solvent to selectively separate the tantalum compound from the columbium compound. Examples of operable solvents include diethyl ketone, methyl isobutyl ketone (hexone), cyclohexanone, tributyl phosphate, diethyl ether, diisopropyl ether, amyl alcohol, 1–25% tri-isooctylamine in a hydrocarbon diluent, 1–25% Rohm and Haas Primene 81–JM–T in kerosene (or fuel oil, turpentine, heptane, etc.), m-toluidine, etc.

The tantalum compounds preferentially transfer into the organic solvent phase, while the columbium and other impurities remain in the aqueous raffinate. This extraction step may be carried out at a temperaure within the range of about 5° to 100° C. with a temperature of approximately 20° to 30° C. being preferred, though temperatures up to the boiling point of the organic extractant may be employed.

The tantalum-rich organic phase recovered from the foregoing extraction system is next scrubbed with water to obtain a fraction containing the organic solvent used to extract the tantalum compound from the columbium compound and an aqueous fraction containing the tantalum compound. In this operation the volume ratio of organic phase to water will be about 1:10 to 10:1.

IV. CRYSTALLIZATION

The purified fluotantalate in the aqueous solution is next converted to the double salt by reaction with inorganic potassium-containing compounds such as potassium fluoride, potassium chloride, potassium carbonate, potassium hydroxide and etc. as follows below:

(1) $H_2TaF_7 + 2KF \rightarrow K_2TaF_7 + 2HF$, or (2) $H_2TaF_7 + 2KOH \rightarrow K_2TaF_7 + H_2O$, etc.

This reaction is preferably carried out at a temperature of about 25° to 60° C. with a mol ratio of the potassium compound to tantalum of about 1.9:1 to 2.5:1. Prior to the addition of the potassium compound it has been found advantageous to dilute the tantalum compound fraction to obtain a feed solution containing about 40 to 50 grams per liter of tantalum. After the reaction is completed, the resulting reaction product mixture is cooled to a temperature of about 10° to 25° C. to precipitate the potassium fluotantalate, as a crystalline solid, which is then filtered and dried at a temperature of about 40° to 120° C.

V. REDUCTION

The dried potassium fluotantalate may be reacted with known alkali metal reducing agents such as sodium, potassium, lithium, etc. or mixtures thereof to produce tantalum metal. The use of metallic sodium as the reducing agent is preferred. The reaction is as follows:

$K_2TaF_7 + 5Na \rightarrow 5NaF + 2KF + Ta$

In general, the reaction is preferably carried out in an inert atmosphere (e.g. argon, neon or mixtures thereof) at a temperature of about 200° to 700° C., preferably about 400° to 500° C. The reaction mass so obtained is a fused mixture of metallic tantalum and salt. The tantalum is recovered by grinding or crushing the fused reaction product mixture followed by leaching with dilute mineral acids or water at a temperature of about 20° to 90° C. If desired, the resulting tantalum powder may be dried at a temperature of about 50° to 150° C.

Referring again to the flow sheet shown in the drawing, it will be seen that numerous commercial advantages can be achieved by utilizing the various recycle and recovery procedures illustrated therein. It should be noted, for example, that unreacted ore recovered when the fluotantalates and fluocolumbates are filtered prior to being subjected to the liquid extraction step may be recycled directly to the ore opening step. The organic fraction recovered when the fluotantalate is scrubbed from the organic solvent may also be advantageously recycled to the liquid extraction step. In another recycled step which ensures high yields of metallic tantalum, the aqueous phase recovered from the filtrate of the potassium fluotantalate containing soluble potassium fluotantalate is returned to the crystallizer to serve as make-up water wherein fluotantalic acid is reacted with potassium compounds such as potassium fluoride or potassium hydroxide. In accordance with another feature of this invention, as shown in drawing, at least a portion of this aqueous phase may be treated to recover tantalum values therefrom in the form of tantalum pentoxide. This may be accomplished by addition of $NH_3$ or $NH_4OH$ to the tantalum-bearing filtrate to attain a pH of 5 to 8 at a temperature of from 20° to 75° C. The following reactions occur:

$H_2TaF_7 + 7NH_4OH \rightarrow H_3TaO_4 + 7NH_4F + 3H_2O$
$K_2TaF_7 + 7NH_4OH \rightarrow H_3TaO_4 + 7NH_4F + 2KOH + H_2O$ The insoluble $H_3TaO_4$ is washed thoroughly with water at 25° C. to completely remove all occluded $NH_4F$ and eliminate fluoride corrosion during calcination. Following filtration the $H_3TaO_4$ is calcined at 500°–1000° C. for about two hours to yield a high purity $Ta_2O_5$. Recovery of $Ta_2O_5$ from the filtrate liquors ranges from 90 to 100 percent.

The invention will be more fully understood by reference to the following illustrative embodiment.

Example

A tantalite ore having the following composition and an average particle size of less than about 100 mesh was employed in this run:

ORE COMPOSITION

| Component: | Wt. percent |
|---|---|
| $Ta_2O_5$ | 53.0 |
| $Cb_2O_5$ | 21.5 |
| $TiO_2$ | 2.0 |
| $SnO_2$ | 6.2 |
| FeO | 5.4 |
| $MnO_2$ | 10.2 |
| Others | 1.7 |

A mixture of 300 grams of the tantalite ore and 300 grams of dry NaOH pellets was formed in a reactor and heated to 310° C. to initiate the reaction. The temperature was gradually heated to about 470° C. over a one hour period. The resulting reaction mixture (called frit) is cooled to about 100° to 150° C. and then removed from the reactor in the form of a powder. The frit was next leached with 1.0 M NaOH at 30° C. to remove excess caustic and soluble salts such as $Na_2SiO_3$, $Na_2AlO_2$, $Na_2SnO_3$, etc. The volume of leach solution employed was equivalent to about 0.5 gallon per pound of ore. The aqueous leach solution is always maintained at a concentration of at least 1.0 M NaOH to prevent the dissolution of small amounts of tantalum and/or columbium.

After filtering the alkaline leach solution, the residue was leached at 60° to 70° C. with 3 N $H_2SO_4$ equivalent in amount to about 13.2 grams of concentrated $H_2SO_4$ per 50 grams of frit. The recovery of columbium plus tantalum values was about 87% without recycle of unreacted ore and about 91% with recycle. In the latter case the concentrate, on a dry weight basis, contained: 1.1% FeO, 7.0% $MnO_2$, 0.1–1.0% $TiO_2$ and 91.0% $Ta_2O_5$ plus $Cb_2O_5$. When sodium peroxide was added to the $H_2SO_4$ leach solution, the $MnO_2$ percentage in the concentrate was reduced to less than 1.0% by weight. Addition of iron powder in place of hydrogen peroxide gave a concentrate containing 0.27% $MnO_2$.

To 4640 grams of undried concentrate, prepared as described above, 2143 grams of 65% HF was added. After a reaction time of about one hour, a solution was obtained which contained the equivalent of about 376 grams of tantalum and columbium oxides per liter at a pH of 1.0. The solution was then filtered, and the insoluble residue recycled to the caustic fusion step. The solution recovered from the filtration was then subjected to a seven stage continuous countercurrent extraction step utilizing methyl isobutyl ketone (hexone) as the extractant. In carrying out this extraction, the feed solution was fed directly to the fourth stage, the hexone to the first stage, and a countercurrent scrub solution comprising 0.5 M hydrofluoric acid to the seventh stage.

The organic product phase, or extract, recovered from the seventh stage contained the equivalent of 155 grams per liter of oxide and assayed greater than 99.8% $Ta_2O_5$ and 0.11% $Cb_2O_5$. All other minor impurities such as Fe, Ni, Pb, Si, Sn, Cr, Ti, V, Mn, etc. totaled less than 500 p.p.m. These results represent a greater than 99.5% recovery of tantalum. The aqueous product phase, or raffinate, recovered from the first stage, contained the equivalent of about 70% $Cb_2O_5$, and less than 0.1% $Ta_2O_5$.

Tantalum values were removed from the organic phase by extraction with water in a continuous three stage counter-current extraction system. In actual operation 300 ml. of the organic phase was passed countercurrently to 600 ml. of water. About 220 ml. of methyl isobutyl ketone was recovered containing less than 1.0 gram per liter of $Ta_2O_5$ while an aqueous, tantalum-containing solution was recovered containing the equivalent of 79 grams per liter of $Ta_2O_5$.

To 5.7 liters of the aqueous tantalum-containing solution, maintained at a temperature of about 70° C., 400 grams of potassium fluoride was added. The solution was allowed to cool over night at about 25° C. A white crystalline $K_2TaF_7$ product was recovered from the solution by filtration. The $K_2TaF_7$ product so recovered was dried at 110° C. for three hours to obtain a dry crystalline powder weighing 748 grams and containing 0.03% $H_2O$ and 34% fluoride. This yield corresponds to a 93.5% recovery of tantalum from the aqueous solution as $K_2TaF_7$. Chemical analyses of the $K_2TaF_7$, on a tantalum basis, was as follows: 250 p.p.m. Al; <30 p.p.m. Cr; 200 p.p.m. Fe; <10 p.p.m. Mn; <20 p.p.m. Ni; <25 p.p.m. Pb; <30 p.p.m. Sn; 60 p.p.m. Ti; 10 p.p.m. V; 200 p.p.m. Si and <0.05% Cb.

In preparing the tantalum metal from the potassium fluotantalate salt, 392 grams of $K_2TaF_7$ were dried at 300° C. for two hours to ensure dryness. The salt was then cooled to less than 98° C., i.e. below the melting point of sodium, maintained under an atmosphere of argon and 116 grams of sodium added. The mixture was agitated while the temperature was slowly increased. The reaction commenced at a temperature of about 300° C., and temperatures as high as 800° C. were reached during the course of the reaction.

The reaction mixture was then sintered for about eight hours. The sintered reaction mixture, referred to as spalt, was cooled to room temperature and withdrawn from the reaction vessel. The spalt was ground to a particle size of about 12 mesh, leached with dilute HCl to dissolve the NaF and KF, and then dried at 160° C. for two hours. The metal powder product was then melted to obtain a tantalum ingot having a Brinnel hardness value of 125 and a fluoride ion content of about 0.01%. Metal contamination of the ingot was as follows: 100 p.p.m. Fe;<20 p.p.m. Ni;<20 p.p.m. Cr; 250 p.p.m. Si;<10 p.p.m. Pb;<10 p.p.m. V;<10 p.p.m. Ca;<10 p.p.m. Na;<25 p.p.m. Mn; and<20 p.p.m. Al. The tantalum metal recovery during reduction was 181 grams, which represents a yield of 98%.

While particular embodiments of this invention are shown above, it will be understood that the invention is obviously subject to modifications without departing from its broader aspects.

What is claimed is:

1. A process for recovering tantalum values from tantalum-containing material which comprises (a) reacting said tantalum-containing material with a substance selected from the group consisting of sodium hydroxide, potassium hydroxide, sodium carbonate, sulfuric acid, and hydrofluoric acid, (b) leaching the resulting reaction mixture with water to remove water-soluble materials, (c) leaching the water-leached reaction mixture with an acid selected from the group consisting of nitric, hydrochloric and sulfuric to remove acid-soluble impurities, (d) reacting said leached reaction mixture with hydrofluoric acid to obtain a mixture comprising fluocomplexes of tantalum and columbium in accordance with the following reactions:

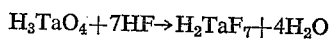

and

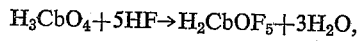

(e) contacting said mixture of fluocomplexes with a water-immiscible, organic solvent to obtain an organic solvent phase rich in said tantalum fluocomplex and a water solvent rich in said columbium fluocomplex, (f) contacting said organic solvent phase with water to obtain a water extract phase containing said tantalum fluocomplex and an organic raffinate phase, (g) reacting said tantalum fluocomplex in said water extract phase with a potassium-containing compound to obtain a potassium fluotantalate salt, (h) reducing said potassium fluotantalate with an alkali metal reducing agent to obtain a reaction product mixture containing tantalum metal, and (i) recovering said tantalum metal from the reaction mixture.

2. The process of claim 1 wherein said tantalum-containing material is a tantalite-columbite ore.

3. The process of claim 1 wherein said tantalum-containing material is initially reacted with sodium hydroxide at a temperature of about 250° to 600° C.

4. The process of claim 1 wherein said potassium-containing compound is potassium fluoride.

5. The process of claim 1 wherein the mixture of tantalum and columbium fluocomplexes is filtered to recover unreacted tantalum-containing material, and said recovered material is recycled to step (a) wherein tantalum-containing material is opened.

6. The process of claim 1 wherein the organic raffinate phase separately recovered in step (f) is recycled to step (e).

7. The process of claim 1 wherein said tantalum metal recovered from step (h) is ground and then leached with a leach solution selected from the group consisting of water and dilute mineral acid.

8. The process of claim 1 wherein said water-immiscible, organic solvent is methyl isobutyl ketone.

9. A process for recovering tantalum values from tantalum-containing material which comprises (a) fusing said tantalum-containing material with an excess of sodium hydroxide at a temperature within the range of about 250° to 600° C., (b) grinding the fused reaction mixture to obtain a finely divided reaction mixture, (c) leaching the finely divided reaction mixture with water to remove unreacted sodium hydroxide and water-soluble metallic impurities and recovering a water-insoluble residue, (d) leaching said residue with aqueous sodium hydroxide solution of at least 1.0 M to remove metallic impurities, (e) leaching said sodium hydroxide-leached residue with a mineral acid selected from the group consisting of nitric, sulfuric and hydrochloric acid to remove metallic impurities and recovering an acid-insoluble residue, (f) dissolving in no more than a stoichiometric amount of hydrofluoric acid to produce a mixture comprising tantalum and columbium fluocomplexes in accordance with the following reactions:

$$H_3TaO_4 + 7HF \rightarrow H_2TaF_7 + 4H_2O$$

and $$H_3CbO_4 + 5HF \rightarrow H_2CbOF_5 + 3H_2O$$

(g) contacting said mixture of tantalum and columbium fluocomplexes with a water-immiscible, organic solvent to obtain a tantalum-rich organic extract phase and a columbium-rich aqueous raffinate phase, (h) contacting said organic extract phase with water to obtain a tantalum-rich aqueous phase containing said tantalum fluocomplex and an organic phase, (i) reacting said tantalum fluocomplex with a potassium-containing compound to produce potassium fluotantalate, (j) reducing said potassium fluotantalate with metallic sodium to obtain a reaction mixture comprising tantalum metal and by-product salts, and (k) recovering said tantalum metal from the reaction mixture.

10. The process of claim 9 wherein said tantalum-containing material is a tantalite-columbite ore.

11. The process of claim 9 wherein said acid leach solution contains a reducing agent.

12. The process of claim 9 wherein said mixture of tantalum and columbium fluocomplexes is filtered to recover unreacted tantalum-containing material, which material is recycled to the fusion step.

13. The process of claim 9 wherein the water-immiscible organic solvent is methyl isobutyl ketone.

14. The process of claim 9 wherein said potassium compound is potassium fluoride.

References Cited in the file of this patent
UNITED STATES PATENTS 2,773,737    Nielson et al.  ---------- Dec. 11, 1956
2,795,481    Hicks et al.  ------------ June 11, 1957

OTHER REFERENCES

Rohmer: "Chemical Abstracts," vol. 36, col. 364 (1942).